(12) United States Patent
Parkvall et al.

(10) Patent No.: US 8,149,875 B2
(45) Date of Patent: Apr. 3, 2012

(54) PACKET-BASED DATA PROCESSING TECHNIQUE

(76) Inventors: Stefan Parkvall, Stockholm (SE);
Niclas Wiberg, Linkoping (SE); Reiner Ludwig, Hurtgenwald (DE); Michael Meyer, Aachen (DE)

( * ) Notice: Subject to any disclaimer, the term of this patent is extended or adjusted under 35 U.S.C. 154(b) by 1023 days.

(21) Appl. No.: 11/570,477

(22) PCT Filed: Jun. 29, 2004

(86) PCT No.: PCT/EP2004/007043
§ 371 (c)(1),
(2), (4) Date: Feb. 11, 2008

(87) PCT Pub. No.: WO2006/002658
PCT Pub. Date: Jan. 12, 2006

(65) Prior Publication Data
US 2008/0285491 A1 Nov. 20, 2008

(51) Int. Cl.
*H04J 3/16* (2006.01)
(52) U.S. Cl. ........ 370/469; 370/464; 370/473; 370/476; 370/479
(58) Field of Classification Search .......... 370/464, 370/469, 470, 473, 479, 468, 472, 476, 477, 370/528–529
See application file for complete search history.

(56) References Cited

U.S. PATENT DOCUMENTS

| | | | | |
|---|---|---|---|---|
| 4,984,290 A | * | 1/1991 | Levine et al. | 455/436 |
| 5,883,893 A | * | 3/1999 | Rumer et al. | 370/395.6 |
| 5,909,439 A | * | 6/1999 | Kuwabara et al. | 370/389 |
| 6,343,104 B1 | * | 1/2002 | Splett | 375/274 |
| 6,567,375 B2 | * | 5/2003 | Balachandran et al. | 370/204 |
| 6,608,818 B1 | * | 8/2003 | Abrol et al. | 370/252 |
| 6,728,319 B1 | * | 4/2004 | Nystrom et al. | 375/243 |
| 6,760,590 B2 | * | 7/2004 | Miyoshi et al. | 455/452.1 |
| 6,778,558 B2 | * | 8/2004 | Balachandran et al. | 370/470 |
| 6,782,884 B1 | * | 8/2004 | Chen et al. | 725/111 |
| 6,950,399 B1 | * | 9/2005 | Bushmitch et al. | 370/236 |
| 6,980,514 B2 | * | 12/2005 | Grob et al. | 370/230 |
| 6,987,780 B2 | * | 1/2006 | Wei et al. | 370/469 |
| 7,006,472 B1 | * | 2/2006 | Immonen et al. | 370/332 |
| 7,178,089 B1 | * | 2/2007 | Frenger et al. | 714/774 |
| 7,304,971 B2 | * | 12/2007 | Balachandran et al. | 370/337 |
| 2002/0136231 A1 | * | 9/2002 | Leatherbury et al. | 370/442 |
| 2003/0097629 A1 | | 5/2003 | Moon et al. | |
| 2003/0203736 A1 | * | 10/2003 | Chi et al. | 455/450 |
| 2003/0227875 A1 | * | 12/2003 | Wei et al. | 370/252 |
| 2007/0230516 A1 | * | 10/2007 | Torsner et al. | 370/538 |

FOREIGN PATENT DOCUMENTS

| | | |
|---|---|---|
| EP | 0 938 207 A | 8/1999 |
| WO | WO 02/17550 A | 2/2002 |

OTHER PUBLICATIONS

International Search Report from European Patent Office issued Feb. 14, 2005 for PCT/EP2004/007043.

* cited by examiner

*Primary Examiner* — Kent Chang
*Assistant Examiner* — Magdi Elhag (57) ABSTRACT

A technique is provided for processing data in a packet-based communications environment. A single data packet is encapsulated into a single link layer packet data unit. The link layer unit is encoded to form at least one code block. After the currently available radio resource capacity during a fixed duration transmission interval has been determined, bits within the code block are selected to fit into or otherwise match the radio resource capacity. Thereafter, the selected bits are transmitted via a physical layer. In some variations, unsolicited redundant sets of bits are transmitted thereafter to facilitate successful receipt.

20 Claims, 3 Drawing Sheets

PACKET-BASED DATA PROCESSING TECHNIQUE

FIELD OF THE INVENTION

The current invention relates to communications. More specifically, the current invention relates to a technique for processing data in a packet-based communications environment.

BACKGROUND OF THE INVENTION

Wireless systems for packet data transfer typically comprise a link layer protocol that supports reliable acknowledged data transfer modes. With such arrangements, transmission errors can be corrected by Automatic Repeat Request (ARQ) protocols. Such ARQ protocols utilize packet data units that can have either a fixed size or variable size that is chosen to match the radio resource capacity.

For 2.5/3G systems which have a fixed physical layer timing structure (i.e., data blocks are transmitted with distinct durations which can include a variable amount of data due to factors such as modulation schemes utilized, link adaption, etc.), data rates are typically too small to permit data packets (from the open systems interconnection network layer (L3)) to fit within a single transmission frame (corresponding to a single open systems interconnection data link layer (L2) packet data unit). Therefore, with L3 data packets that do not fit exactly into the provided radio resources, segmentation is required to build two or more corresponding L2 packet data units. As a result, additional processing resources are consumed and complexity of the protocol is increased. Furthermore, as medium access control (MAC) scheduling of link layer packet data units is conducted independently of the network layer data packets, the boundaries of the data packets are not always properly considered, which results in additional user-perceived delays (especially when a small part of a data packet is transmitted in a subsequent frame).

Accordingly, it will be appreciated that there remains a need for an improved technique for processing data packets for transmission via a physical layer.

SUMMARY OF THE INVENTION

The invention may be embodied in a method for processing data in a packet-based communications environment. Such a method may include the steps of encapsulating a single data packet (that may have been received from a network layer) into one link layer packet data unit, encoding the link layer packet data unit to form at least one code block, determining radio resource capacity (e.g., number of bits that may be transmitted) during a fixed duration transmission interval (such as the next transmission interval or other identifiable transmission interval), selecting bits of the code block to fit into the available radio resource capacity, and transmitting the selected bits via a physical layer. The determination regarding the radio resource capacity may be based on modulation scheme, time slots, spreading codes, orthogonal frequency division multiplexing sub carriers, the number of scheduled link layer packet data units and the like.

There are many variations that may be implemented, either singly or in combination, in connection with the method. For example, the selecting step may puncture, repeat, or otherwise process the code block by selecting bits (e.g., information (systematic bits) and/or redundancy bits) to fit into (or otherwise match) the radio resource capacity. The link layer packet data units may be encoded with a channel coder such as a convolutional coder, a turbo coder, an LDCP coder, a forward error correction coder or the like. The invention may be implemented in connection with a wireless system such as Wideband Code Division Multiple Access (WCDMA) or General Packet Radio Service (GPRS).

The method may be practiced in connection with an ARQ environment. Such ARQ environments often include the transmission of an acknowledgment and/or non-acknowledgment signal dependent on the successful receipt of data. If an acknowledgment signal has not been received (and in some cases if a non-acknowledgment signal, such as a NACK signal, has been received), the method may include the step of retransmitting the selected bits (e.g., a set of bits identical to those previously transmitted according to the Chase combining approach) until such an acknowledgement signal is received. Optionally or in the alternative, the method may also include the subsequent steps of selecting the bits of the code block to fit within the currently available radio resource capacity (i.e., a new set of bits may be selected for the subsequent transmission), transmitting the selected bits via the physical layer, and repeating the aforementioned selection and transmission steps until an acknowledgment signal is received (or optionally, until it is determined that the contents of the code block were successfully received). For the transmissions, the method may include the step of determining the probability of a successful receipt of the link layer packet data unit in order to decide whether more selected bits should be sent without waiting for a non-acknowledgement signal. Accordingly, transmissions or retransmissions may be performed dependent on the determined probability. The method may also provide that redundancy (e.g., the amount of the selected bits) is adapted (e.g., increased or decreased) for each transmission.

The above also applies to certain circumstances in which large data packets (or coded bits generated therefrom) do not fit into the available radio resource capacity provided for the next transmission interval. Rather than segmenting the data packet into several link layer packet data units, a the data packet is encapsulated into a single link layer packet data unit and multiple transmissions may be scheduled. With an initial transmission, a first bit selection pattern (e.g., a first puncturing pattern) may be used. At the next transmission interval, a next subset of coded bits according to a second bit selection pattern (e.g., a second puncturing pattern) may be transmitted, and so forth, as required.

The method may also provide that the selected bits are transmitted and/or retransmitted independent of (e.g., prior to) the receipt of a signal indicating that the link layer packet data unit was not successfully received (e.g., a NACK signal) and/or that redundant bits are transmitted prior to the receipt of a NACK signal or any other ARQ signal. Accordingly, the method may provide for the unsolicited retransmission of selected bits and/or the unsolicited transmission of bits selected according to different bit selection techniques for redundancy purposes.

With arrangements in which bits are retransmitted and/or selected bits are sent for redundancy purposes, the method may include the step of storing at least one of control information (such as the puncturing pattern or a redundancy version identifier) and the coded bits (e.g., the whole code block) for subsequent access as may be required for retransmissions and/or transmissions. The method may also include the step of storing the received code bits by the receiver (for purposes such as combining, decoding, etc.).

If it is determined that the amount of the bits that need to be transmitted exceeds the transmission capabilities of the currently available radio resource capacity, the selecting step may distribute (e.g., puncture) the amount of bits that need to be transmitted into two or more sets of bits, each optionally having the same sequence number.

In order to ensure that data packets (such as IP data packets) are properly handled the method may include the step of scheduling the transmission of the IP data packets based on requirements of an application or service. This scheduling may be based on characteristics such as data packet header information, queue length, queuing time of data packets, data packet lengths, and radio resource capacity. To further facilitate scheduling, the data packets may include an indicator (e.g., DiffServ designation) of the associated application or service requirements.

The method may, in some variations, comprise the steps of receiving a cyclic redundancy code corresponding to each data packet, and conducting a parity check on the received data packet using the cyclic redundancy code. If the encoding step generates multiple code blocks, then one cyclic redundancy code is generated for all of the code blocks (e.g., all parallel code blocks have to be received until a CRC check can be performed). According to a preferred embodiment, one CRC is generated for each link layer packet data unit. The method may also include the step of transmitting control information pertaining to the link layer packet data unit, such as link layer sequence number, payload size, puncturing pattern utilized, code rate, amount of coded bits, redundancy version identification, and the like, to facilitate soft combining at a receiver.

At a receiver, the received signal (containing the link layer packet data unit) may be demodulated and decoded. If the decoding was successful in an ARQ scenario, an acknowledgment signal is sent back to the sender and the payload is extracted out of the link layer packet data unit. If the decoding was not successful, a non-acknowledgment signal is generated. If a non-acknowledgment signal is received by the sender, it selects the amount of redundancy for the retransmission based on channel quality (i.e., the state of the physical channel), the radio resource capacity, and optionally the desired probability for successful decoding. The redundancy amount is selected according to the bit selection technique applied for the retransmission. Thereafter, the transmission is sent. Transmissions with new bit selection patterns may be iterated until the data is correctly received (e.g., until an acknowledgment signal is received).

The invention may also be a method for processing data in a packet-based communications environment. This method includes the steps of receiving at least one set of bits corresponding to at least one code block, each set of bits being received during a fixed duration transmission interval and substantially consuming all radio resource capacity (e.g., corresponding to an individual application or user) during the respective transmission interval, the at least one code block corresponding to a link layer packet data unit encapsulated from a single data packet, and subjecting the received at least one set of bits corresponding to the data packet to a decoding operation. The decoding operation may be started only upon receipt of an explicit decoding request (such as corresponding control information received out of band). Optionally, the method may also include the step of sending an acknowledgment signal if the decoding operation was successful or a non-acknowledgment signal if the decoding operation was not successful.

The current invention may also be embodied as a computer program product comprising program code portions for performing the steps of the methods provided herein (and optionally one or more of the variations thereto) when the computer program product is run on a computer system. In some variations, the computer program product is stored on a computer readable recording medium.

In yet another embodiment, a system is provided comprising a computer processor and a memory coupled to the processor, wherein the memory is encoded with one or more programs that may perform the steps of the methods provided herein (and optionally one or more of the variations thereto).

The invention may also take the form of an apparatus for processing data in a packet-based communications environment. Such an apparatus includes a construction unit for encapsulating a single data packet (e.g., from a network layer) into one link layer packet data unit, a coder for encoding the link layer packet data unit to form at least one code block, an analysis unit for determining radio resource capacity during a fixed duration transmission interval, a selection unit for selecting bits of the code block to fit into the available radio resource capacity, and a transmitter for transmitting the selected bits via a physical layer.

In another embodiment, a further apparatus for processing data in a packet-based communications environment is provided. The system includes a receiver to receive at least one set of bits corresponding to at least one code block, each set of bits being received during a fixed duration transmission interval and substantially consuming all radio resource capacity during the respective transmission interval, the at least one code block corresponding to a link layer packet data unit encapsulated from a single data packet, and a decoder to subject the received at least one set of bits corresponding to the data packet to a decoding operation. The system may also include a feedback unit to send an acknowledgment signal if the decoding operation was successful or a non-acknowledgment signal if the decoding operation was not successful.

BRIEF DESCRIPTION OF THE DRAWINGS

In the following the invention will be described with reference to exemplary embodiments illustrated in the figures, in which.

DETAILED DESCRIPTION OF THE PREFERRED EMBODIMENTS

In the following description, for purposes of explanation and not limitation, specific details are set forth, such as particular sequences of steps and various configurations, etc, in order to provide a thorough understanding of the present invention. It will be apparent to one skilled in the art that the present invention may be practiced in other embodiments that depart from these specific details. Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described as a method, it may also be embodied in a computer program product as well as a system comprising a computer processor and a memory coupled to the processor, wherein the memory is encoded with one or more programs that may perform the methods disclosed herein.

Figure 1:
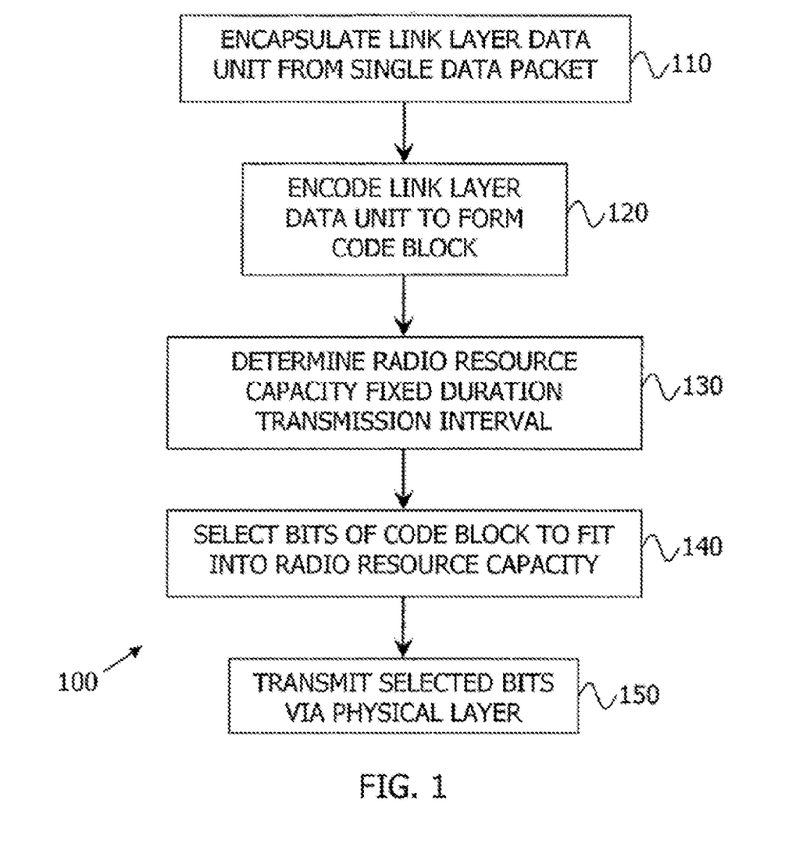
FIG. 1 is a process flow diagram of a method embodiment of the invention.

FIG. 1 is a process flow diagram illustrating a method 100 for processing data in a packet-based communications environment. The method commences, at step 110, with encapsulating a single data packet (which may be received from a network layer) into one link layer packet data unit. The link layer packet data unit is subsequently, at step 120, encoded to form at least one code block. Thereafter (or alternatively prior to the encoding step 120), at step 130, the radio resource capacity (e.g., the number of bits that may be transmitted) during a fixed duration transmission interval (i.e., the transmission intervals are not affected by or otherwise adjusted to reflect the amount of data that is to be sent) are determined. It should be noted that two or more transmission intervals of fixed but different durations may be defined. The available radio resource information is used, at step 140, to select bits of the code block to fit into the available radio resource capacity. Once the bits have been selected, at step 150, they are transmitted via a physical layer.

The fixed duration transmission interval could imply that the protocol/environment utilizes a fixed physical layer timing structure in contrast to protocols such as Ethernet and PPP, wherein the timing structure is variable based on packet size.

Figure 2:
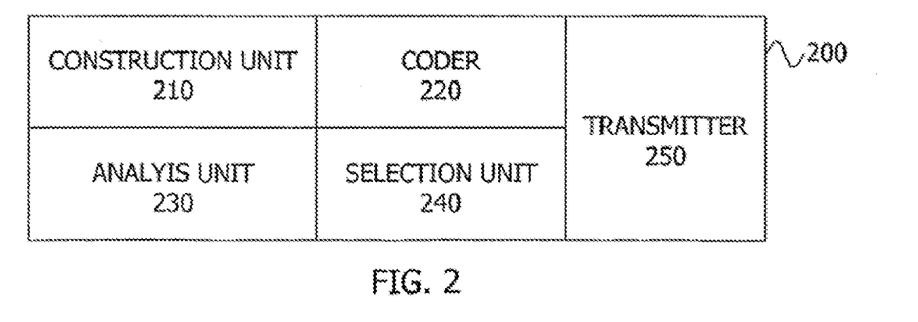
FIG. 2 is a schematic diagram of an apparatus embodiment of the invention.

FIG. 2 illustrates an apparatus 200 for processing data in a packet-based communications environment. The apparatus includes a construction unit 210 for encapsulating one link layer packet data unit into a single data packet (which may be received from a network layer). A coder 220 is provided for encoding the link layer packet data unit to form at least one code block. Optionally, a plurality of coders may be utilized to encode the link layer packet data unit into several code blocks in parallel. An analysis unit 230 determines radio resource capacity during fixed duration transmission intervals. A selection unit 240 selects bits of the code block to fit into the available radio resource capacity. The selected bits may be transmitted by a transmitter 250 via a physical layer. The various components of the apparatus 200 may be each directly coupled to one or more of the other components (as may be required by their individual functionality) or they may be coupled via a bus, network, or other coupling mechanism.

The following description provides numerous examples useful for understanding and implementing the invention as well as variations that may be incorporated which are applicable both to the method 100 of FIG. 1 and the apparatus 200 of FIG. 2.

Figure 3:
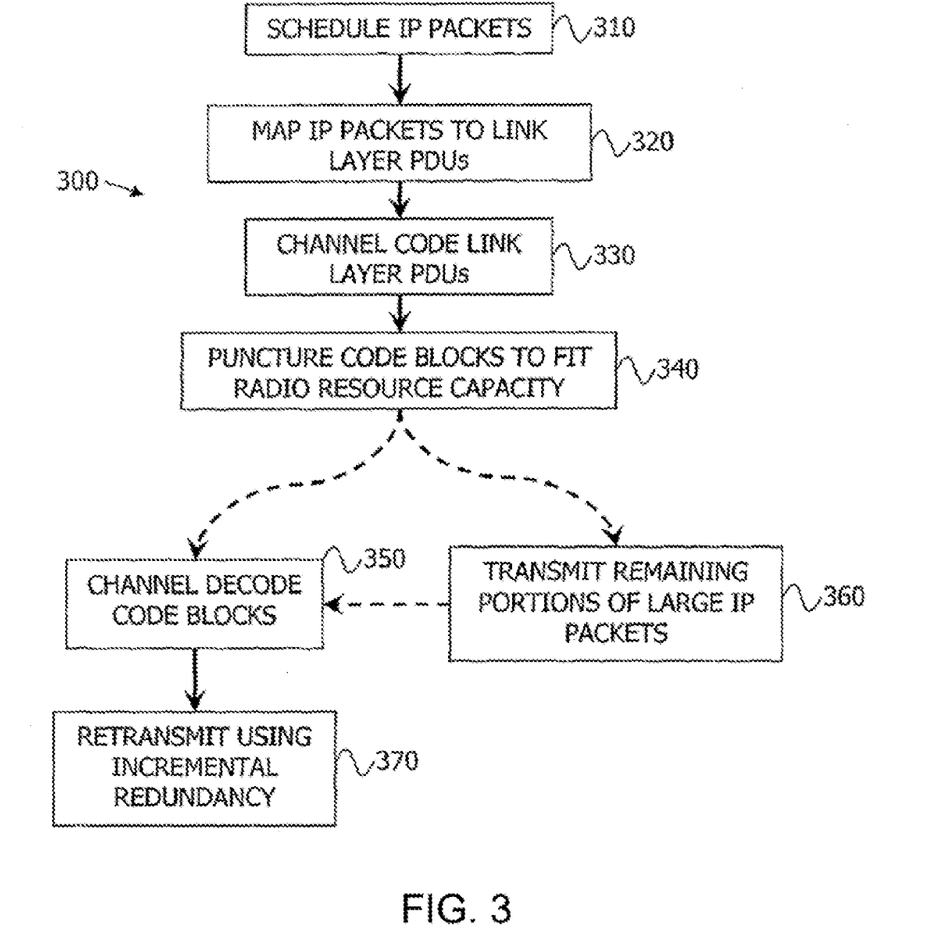
FIG. 3 is a first process flow diagram useful for understanding and implementing the invention.

With reference to FIG. 3, a process flow diagram 300 useful for understanding and implementing the invention is illustrated. The example includes the following steps/phases (as described in further detail below): scheduling of IP packets 310, mapping of IP packets to link layer packet data units (packet data units) 320, channel coding the link layer packet data units 330, puncturing the code blocks to fit within the radio resource capacity 340, channel decoding of received code blocks 350, transmitting remaining portions of large IP packets 360 (which is followed up by the channel decoding step 350), and retransmitting using incremental redundancy 370.

The step of scheduling the IP packets 310 determines which IP packets should be sent in the next transmission interval. The IP packets may be associated with several users and/or several services. In some variations, a differentiated service scheme (DiffServ) is used to mark the IP packets for services and/or requirements of services. The DiffServ bits are then used by the scheduler to determine which IP packets are to be transmitted. The DiffServ bits are used in addition to other locally available information pertinent to scheduling, such as data packet header information, queue length, queuing time of individual IP packets, IP packet lengths, radio resource capacity, and the like.

Once the IP packets are scheduled, a sender protocol stack forwards the IP packets to the link layer, where an IP packet is encapsulated into a single link layer (or L2) packet data unit. The mapping step 320 maps each IP packet to exactly one link layer packet data unit. As a result, a single sequence number is generated per IP packet. Corresponding control information (e.g., payload size) is generated. A cyclic redundancy code is also generated for each link layer packet data unit.

With the mapping step 320, the link layer packet data units may be large (e.g., a 1500 byte IP packet having 12,000 information bits). For example, for jumbo frames of 9,000 bytes (maximum transmission unit—MTU of gigabit Ethernet) there would be 72,000 bits in a single link layer packet data unit, which is significantly larger than link layer packet data units in existing cellular networks. In addition to being large, the size of link layer packet data units is variable. The size can range from an IP header up to Ethernet MTU sizes or larger. As the current invention obviates the requirement for segmentation and concatenation, one link layer sequence number is used per IP packet (for fixed transmission interval protocols as described herein). Similarly, several link layer packet data units cannot correspond to a single IP packet.

The next step 330 is the channel coding of the link layer packet data units. The link layer packet data units are encoded with a channel code, such as a channel code capable of supporting incremental redundancy HARQ (hybrid automatic repeat request) schemes. Sample channel codes include convolutional codes, turbo codes, or LDCP codes. The chosen code rate for the encoder is low (e.g., code rate 1/6) so that sufficient redundancy (e.g., incremental redundancy) may be generated for several transmissions, if required. The encoded bits may be stored for later usage for possible retransmissions.

The puncturing step 340 selects those bits (e.g., information (systematic bits) and/or redundancy bits) for transmission that fit into the previously determined radio resource capacity for the respective (e.g., next available) transmission interval. The puncturing step 340 takes into account the number of link layer packet data units that have been scheduled as such packet data units might need to be distributed across several transmission time intervals. The radio resource capacity may be based on modulation schemes, time slots, spreading codes, OFDM sub carriers and the like. User data from two or more users is typically not mixed into one radio resource block, although, if desired, multiple link layer packet data units associated with a single user may be mapped to a single resource block. It will be appreciated that other techniques for bit selection may be used other than puncturing depending on the desired selection criteria.

The puncturing of the channel code block 340 may be based on radio quality criteria such as QoS requirements and channel quality. In some cases, a low code rate may be selected while in other cases having loose requirements and good channel quality, a code rate slightly smaller than 1 could be sufficient. An error probability is determined, which is used to predict whether the transmission will be successful. If the probability for a successful transmission is below a certain threshold (which can depend on service requirements, packet header information and the like), then another transmission or retransmission is scheduled without waiting for a NACK signal. This is called unsolicited transmission/retransmission. If the probability is equal or above the threshold, the sender schedules another transmission or retransmission only in case of a NACK signal or other protocol events (e.g. a timer expiry).

As an illustration, two IP packets each associated with a different user are scheduled for the next transmission interval. Each IP packet is 1,500 bytes (i.e., 9,000 bits).

The channel quality of the first user is good, while the channel quality for the second user is poor, and each have similar delay requirements.

A channel-state dependent selection of the radio resources (e.g., frequency selective channel) is performed (i.e., the favorable radio resources are used for each user). According to that selection, the radio resources are 18,000 bit for the first user and 24,000 bit for the second user, respectively corresponding to rates of 2/3 and 1/2. For both packets, it is assumed that the packets can be successfully transmitted with high probability. Therefore, no unsolicited transmission is scheduled.

The mother code (e.g., code rate 1/6 corresponding to 72,000 bits per IP packet) is punctured to the code rates of 2/3 and 1/2. The code bits (or selections thereof) are stored for later transmission, if required. Thereafter, the punctured code bits are transmitted in the next transmission interval. In addition to the data transmission, control information may be sent out of band to facilitate soft combining. This control information might include data such as link layer sequence number, payload size, redundancy version identification (identifier pertaining to particular puncturing or other bit selection pattern), amount of coded bits, code rate, and the like.

At a receiver side, the received signal is demodulated and decoded at step 350. If the decoding was successful (i.e., the CRC test has been passed), an ACK (acknowledgment signal) is fed back to the sender and the payload is extracted out of the link layer packet data unit. The extracted IP packet is then sent to the IP layer.

If the decoding was not successful, a NACK (non-acknowledgement signal) is generated and sent, which is in effect a request for more redundancy to increase the probability for a successful decoding.

If a NACK is received by the sender (or originator), it determines based on (i) channel quality, (ii) the radio resource capacity, and optionally (iii) the desired probability for successful decoding, the amount of redundancy for the retransmission. The redundancy amount is selected according to the puncturing pattern (or other bit selection technique) applied for the retransmission and thereafter the retransmission is sent at step 370. If soft-combining is utilized, then control information may also have to be sent out of band. Retransmissions with new bit selection patterns may be iterated until the data is correctly received (e.g., until an ACK is received).

With regard to step 360, in certain circumstances large IP packets do not fit into the available radio resource capacity provided for the next transmission interval. Rather than segmenting the IP packet into several link layer packet data units, incremental redundant transmissions are used. For example, if 40,000 coded bits need to be transmitted (e.g., have been chosen dependent on the probability of successful receipt out of 72,000 coded bits that have been generated from an IP packet of 1,500 bytes), but there are only resources for 12,000 bits, the initial transmission sends 12,000 bits selected according to a first puncturing pattern (or other bit selection pattern or technique). At the next transmission interval, a next subset of coded bits according to a second puncturing pattern may be transmitted, and so forth, as required.

As the same sequence number may be used for the initial transmission and each retransmission, the receiver does not differentiate whether the subsequent transmissions are requested retransmissions (NACK) or required transmissions. In such arrangements, the ARQ protocol may be modified so that the subsequent transmissions are sent without waiting for a feedback message (e.g., NACK). As the receiver receives the first transmission and cannot decode the message successfully, it sends a NACK. However, this NACK is ignored at the sender because it knows that a second transmission is already on its ways and waits for the respective ACK/NACK of that second transmission, before another retransmission is scheduled.

Another technique to minimize unnecessary retransmissions, and which also saves processing resources at the receiver, is to use the signaled code rate, or alternatively, the ratio of payload size and amount of selected bits, as an indicator for the probability for a successful reception at the receiver. If the code rate or the aforementioned ratio is above a certain threshold (e.g., 1), the decoding process does not commence until the next transmission or retransmission. In addition, during this period of time, a non-acknowledgment signal (e.g., NACK) is not returned to the sender. Yet another alternative is to transmit an explicit flag in the control information block sent out-of-band indicating that the receiver should not commence decoding the received bits.

Figure 4:
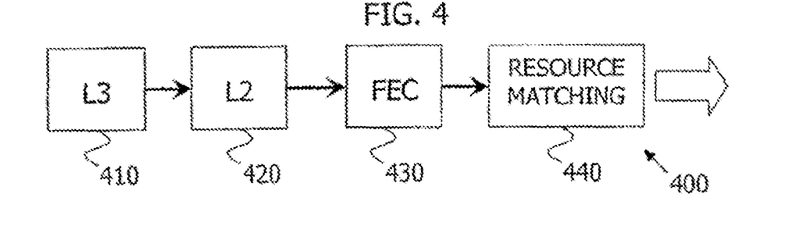
FIG. 4 is a second process flow diagram useful for understanding and implementing the invention.

FIG. 4 illustrates a process flow diagram 400 relating to the transformation of a data structure in a specific variation useful for understanding and implementing the invention. With this example, an L3 IP data packet 410 (e.g., having a size of 1,500 bytes) is encapsulated into a single L2 packet data unit 420. This L2 packet data unit 420 is encoded using a forward error correction code to form an FEC code block 430. With a mother code having a code rate of 1/6, 72,000 code bits are thus obtained.

In an optional step not shown in FIG. 4 the probability of a successful receipt of the transmitted bits is determined and depending on this determination a certain amount of code bits that need to be transmitted is scheduled. It may thus, for example, be scheduled that 40,000 of the 72,000 code bits need to be transmitted to attain a certain (e.g., predefined) probability of a successful receipt.

Depending on the available radio resource capacity (e.g., 12,000 bits) and taking into account unused radio resources (rather than merely the complete capacity of the radio resources), certain bits of the FEC code block 430 may be selected for transmission to form a resource matching bit set 440 (resulting in the use of all radio resource capacity). This bit set 440 may then be transmitted via a physical layer for subsequent decoding. If, in the above example, 40,000 code bits are scheduled for transmission and the radio recourse capacity allows a maximum transmission of 12,000 bits per fixed duration transmission interval, the 40,000 bits that need to be transmitted are distributed over several transmission time intervals.

Figure 5:
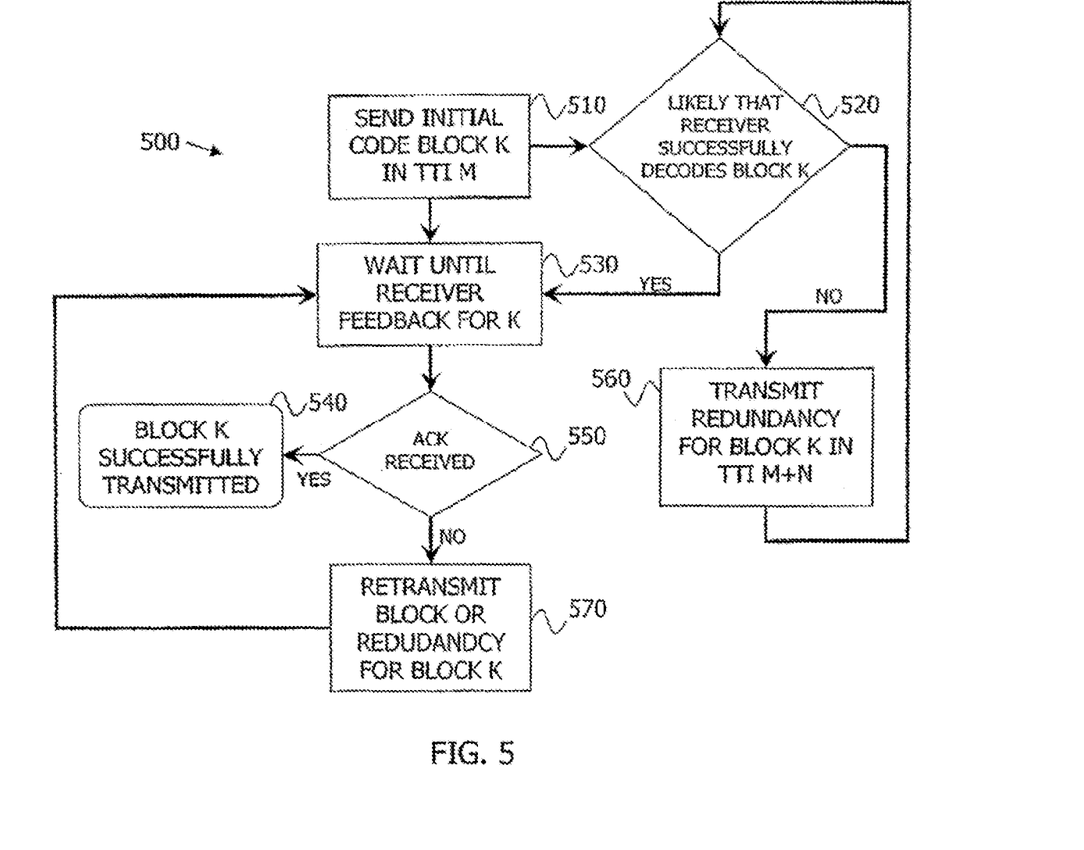
FIG. 5 is a third process flow diagram useful for understanding and implementing the invention.

With regard to FIG. 5, a process flow diagram 500 of another example useful for understanding and implementing the invention is illustrated. The diagram 500 pertains to actions that may be taken in connection with the current invention and that occur after an initial set of bits has been transmitted to a receiver (not shown). At step 510, an initial bit selection of code block K is sent in transmission time interval M (that has a fixed duration independent of the IP packet size). Thereafter, a determination may be made, at step 520, whether it is likely that the receiver will successfully decode the link layer packet data unit corresponding to code block K If it is likely that the receiver will successfully decode the link layer packet data unit corresponding to code block K, then, at step 530, the technique waits for an ACK signal to be received. Otherwise, at step 560, one or more redundant code bit sets are transmitted (e.g., using techniques described above) for code block K in the transmission time interval M+N (and preferably N=1) and, if required, one or more further transmission time interval. At step 550, if an ACK signal is received, then it is determined, at step 540, that the link layer packet data unit corresponding to code block K was successfully transmitted. If an ACK signal is not received (or a NACK signal is received), then, at step 570, either a particular bit selection from the code block K is retransmitted, or redundancy for block K is transmitted.

Optionally, in some variations, the process may exclude step 520 and those associated therewith (e.g., step 530) so that after the initial code block is sent at step 510, the next subsequent step is to wait for an ACK signal to be received at step 530.

The skilled artisan will appreciate the various benefits and improvements of the packet centric link layer that maps a single IP data packet to a single link layer packet data unit and takes into account channel variations provided herein. For example, the requirement for packet requirement for segmenting and concatenation in the data link layer protocol has been obviated thereby reducing end-to-end delay associated therewith and the complexity of the protocol. Such segmentation is also no longer necessary even for large IP packets that do not fit within the radio resources for a single transmission interval, based in part on the HARQ functionality. In addition, QoS scheduling is facilitated as MAC scheduling is accomplished on an IP packet basis. Moreover, scalability of the protocol for a wide variety of data rates is increased and service data unit (SDU) discard is simplified. In sum, the packet centric link layer concept provides a very efficient cross layer method integrating network, link and physical layer.

While the present invention has been described with respect to particular embodiments (including certain system arrangements and certain orders of steps within various methods), those skilled in the art will recognize that the present invention is not limited to the specific embodiments described and illustrated herein. Therefore, while the present invention has been described in relation to its preferred embodiments, it is to be understood that this disclosure is only illustrative. Accordingly, it is intended that the invention be limited only by the scope of the claims appended hereto.

The invention claimed is:

1. A method for processing data in a packet-based communications environment, the method comprising the steps of:
encapsulating a single data packet into one link layer packet data unit;
encoding the link layer packet data unit to form at least one code block;
determining radio resource capacity during a fixed duration transmission interval;
selecting bits of the at least one code block to fit into the available radio resource capacity, wherein the at least one code block is distributed into two or more sets of bits, each of the two or more sets of bits having the same sequence number, when the amount of bits that need to be transmitted exceeds the transmission capabilities of the currently available radio resource capacity; and
transmitting the selected bits via a physical layer.

2. The method of claim 1, wherein the selecting step punctures the at least one code block to fit into the available radio resource capacity.

3. The method of claim 1, wherein the encoding step encodes the link layer packet data units with a channel coder.

4. The method of claim 1, further comprising the step of: retransmitting the selected bits until an acknowledgement signal is received.

5. The method of claim 1, further comprising the steps of:
i. selecting the bits of the at least one code block to fit within currently available radio resource capacity;
ii. transmitting the selected bits via the physical layer; and
iii. repeating steps (i) and (ii) until an acknowledgment signal is received.

6. The method of claim 4, further comprising the step of: determining the probability of a successful receipt of the selected bits, wherein the transmission or retransmission is performed dependent on the determined probability.

7. The method of claim 5, wherein a redundancy is adjusted for each transmission.

8. The method of claim 4, wherein the selected bits are transmitted or retransmitted independent of a signal indicating that the link layer packet data unit was not successfully received.

9. The method of claim 4, further comprising the step of storing the at least one of code bits and control information for subsequent access by at least one of a sender and a receiver.

10. The method of claim 1, further comprising the step of: scheduling the transmission of the data packets based on requirements of an application or service.

11. The method of claim 10, wherein the scheduling is based on at least one characteristic chosen from the group comprising: data packet header information, queue length, queuing time of data packets, data packet lengths, and radio resource capacity.

12. The method of claim 1, further comprising the step of transmitting control information pertaining to the link layer data.

13. The method of claim 12, wherein the control information includes at least one of the group comprising: link layer packet data unit sequence number, pay-load size, puncturing pattern, code rate, amount of coded bits, and redundancy version identification.

14. The method of claim 1, wherein the communications environment is a wireless system.

15. The method of claim 1, wherein the fixed duration transmission interval is the next subsequent transmission interval.

16. A method for processing data in a packet-based communications environment, the method comprising the steps of:
receiving at least one code block, the at least one code block being distributed into two or more sets of bits, each of the two or more sets of bits having the same sequence number, each of the two or more sets of bits being received during a fixed duration transmission interval and substantially consuming all radio resource capacity during the respective transmission interval, the at least one code block corresponding to a link layer packet data unit encapsulated from a single data packet; and
subjecting the received two or more sets of bits corresponding to the data packet to a decoding operation.

17. The method of claim 16, further comprising the step of: sending an acknowledgment signal if the decoding operation was successful or a non-acknowledgment signal if the decoding operation was not successful.

18. An apparatus for processing data in a packet-based communications environment, the apparatus comprising:
a construction unit for encapsulating a single data packet into one link layer packet data unit;

a coder for encoding the link layer packet data unit to form at least one code block;

an analysis unit for determining radio resource capacity during a fixed duration transmission interval;

a selection unit for selecting bits of the at least one code block to fit into the available radio resource capacity, wherein the at least one code block is distributed into two or more sets of bits, each of the two or more sets of bits having the same sequence number, when the amount of bits that need to be transmitted exceeds the transmission capabilities of the currently available radio resource capacity; and a transmitter for transmitting the selected bits via a physical layer.

19. An apparatus for processing data in a packet-based communications environment, the apparatus comprising:

a receiver to receive at least one code block, the at least one code block comprising two or more sets of bits, each of the two or more sets of bits having the same sequence number, each of the two or more sets of bits being received during a fixed duration transmission interval and substantially consuming all radio resource capacity during the respective transmission interval, the at least one code block corresponding to a link layer packet data unit encapsulated from a single data packet; and a decoder to subject the received at least one set of bits corresponding to the data packet to a decoding operation.

20. The apparatus of claim 19, further comprising:

a feedback unit to send an acknowledgment signal if the decoding operation was successful or a non-acknowledgment signal if the decoding operation was not successful.

* * * * *

UNITED STATES PATENT AND TRADEMARK OFFICE
CERTIFICATE OF CORRECTION

PATENT NO. : 8,149,875 B2  
APPLICATION NO. : 11/570477  
DATED : April 3, 2012  
INVENTOR(S) : Parkvall et al.

Page 1 of 1

It is certified that error appears in the above-identified patent and that said Letters Patent is hereby corrected as shown below:

In the Drawings

In Fig. 2, Sheet 1 of 3, in Box "230", in Line 1, delete "ANALYIS" and insert -- ANALYSIS --, therefor.

In the Specification

In Column 2, Line 38, delete "a the" and insert -- the --, therefor.

In Column 8, Line 67, delete "K" and insert -- K. --, therefor.

In Column 9, Line 6, delete "Kin" and insert -- K in --, therefor.

Signed and Sealed this  
Fifteenth Day of April, 2014

Michelle K. Lee  
*Deputy Director of the United States Patent and Trademark Office*